(12) United States Patent
Kumai

(10) Patent No.: US 7,894,020 B2
(45) Date of Patent: Feb. 22, 2011

(54) POLARIZING DEVICE, METHOD FOR MANUFACTURING THE SAME, LIQUID CRYSTAL DEVICE, AND PROJECTION DISPLAY DEVICE

(75) Inventor: Yoshitomo Kumai, Okaya (JP)

(73) Assignee: Seiko Epson Corporation (JP)

( * ) Notice: Subject to any disclaimer, the term of this patent is extended or adjusted under 35 U.S.C. 154(b) by 437 days.

(21) Appl. No.: 12/132,656

(22) Filed: Jun. 4, 2008

(65) Prior Publication Data

US 2008/0303987 A1    Dec. 11, 2008

(30) Foreign Application Priority Data

Jun. 5, 2007    (JP)    ............................. 2007-149097

(51) Int. Cl.
*G02F 1/1335* (2006.01)
*G02F 1/1333* (2006.01)
*G02B 5/30* (2006.01)

(52) U.S. Cl. ............................. 349/96; 349/84; 349/92; 359/485

(58) Field of Classification Search .................... 349/96, 349/84.92; 359/485
See application file for complete search history.

(56) References Cited

U.S. PATENT DOCUMENTS

| | | | | |
|---|---|---|---|---|
| 7,289,173 | B2 * | 10/2007 | Kawazu et al. | 349/96 |
| 2008/0037101 | A1 * | 2/2008 | Jagannathan et al. | 359/286 |
| 2008/0117509 | A1 * | 5/2008 | Hayashi et al. | 359/486 |
| 2009/0153961 | A1 * | 6/2009 | Murakami et al. | 359/486 |
| 2009/0219617 | A1 * | 9/2009 | Asakawa et al. | 359/486 |

FOREIGN PATENT DOCUMENTS

JP    05-136103    6/1993

* cited by examiner

*Primary Examiner*—Mike Qi
(74) *Attorney, Agent, or Firm*—Harness, Dickey & Pierce, P.L.C.

(57) ABSTRACT

A polarizing device includes: a polarizing device unit composed of a metallic film formed on a base, the metallic film having a plurality of slit-shaped openings; and an etching sacrifice layer provided between the base and the polarizing device unit, so that the etching sacrifice layer is partly etched together with the metallic film during the etching of the polarizing device unit; wherein the etching sacrifice layer is composed of a material that has an etching rate equal to or greater than that of the metallic film.

11 Claims, 6 Drawing Sheets

POLARIZING DEVICE, METHOD FOR MANUFACTURING THE SAME, LIQUID CRYSTAL DEVICE, AND PROJECTION DISPLAY DEVICE

BACKGROUND

1. Technical Field

The present invention relates to a polarizing device, a method for manufacturing thereof, as well as a liquid crystal device and a projection display device.

2. Related Art

Polarizing devices formed including grid patterns that are shaped on a glass substrate have been suggested as polarizing devices used for light valves in liquid crystal projectors. A line-to-spacing (L/S) ratio, where a grid width is defined as L and a space between grids is defined as S, is an important parameter to determine the optical property of the polarizing devices. For instance, a high optical property is obtained by making the L/S ratio small, in other words, increasing the space between the grids and narrowing the width of the lines.

The aforementioned grid patterns are formed by patterning, for instance, Al with dry etching. The optical property of the polarizing devices is therefore affected by a state of Al during dry etching. However, controlling the structure of a pattern in dry etching is difficult when forming a grid pattern (polarizing device unit) with a high aspect ratio as well as with a small L/S ratio. In order to prevent the side etching derived from the above problem, one technique utilizes tungsten (W) that has a higher selection ratio with respect to Al as a mask (refer to JP-A-5-136103 for an example).

However, using a tungsten mask alone does not resolve the difficulties in controlling the endpoint during dry etching (prevention of side etching), and the grid pattern with a high aspect ratio structure may not be formed in a high precision. Moreover, in the technique described above, a TiN layer is used as an undercoat layer for the Al layer. Since the optical transparency of the TiN layer is low, the TiN layer being formed on the surface of the glass substrate, a desired optical property may not be obtained when applying the above technique to the manufacturing of the polarizing device. Therefore, a new technique alternative to the above etching technique has been desired.

SUMMARY

An advantage of the invention is to provide a polarizing device having a high aspect ratio structure in which grid pattern overetching is prevented, and a method for manufacturing the polarizing device, in addition to providing a liquid crystal device and a projection display device.

According to a first aspect of the invention, a polarizing device includes: a polarizing device unit composed of a metallic film formed on a base, the metallic film having a plurality of slit-shaped openings; and an etching sacrifice layer provided between the base and the polarizing device unit, so that the etching sacrifice layer is partly etched together with the metallic film during the etching of the polarizing device unit; wherein the etching sacrifice layer is composed of a material that has an etching rate equal to or greater than that of the metallic film.

Since this polarizing device includes the sacrifice layer that has an etching rate equal to or greater than that of the metallic film, the margin in controlling an etching endpoint expands during etching, due to the sacrifice layer being dug in. Consequently, the overetching of the polarizing device unit caused by the side etching of the metallic film is prevented, thereby realizing a high aspect ratio structure. As a result, the polarizing device obtains a high aspect ratio structure with a high optical property, while the overetching of the polarizing device is prevented.

In this case, the etching sacrifice layer may be made of a resin material.

This prevents the polarizing device unit from being damaged when carrying out rubbing processing in order to form an orientation film on the polarizing device unit, at the time of mounting the polarizing device in the liquid crystal device, since the rubbing pressure is moderated by the etching sacrifice layer composed of a resin material.

Moreover, it is preferable that the resin material include one of methacrylic resin and acrylic resin.

Using this material allows a preferable forming of the etching sacrifice layer described above.

It is preferable that a film thickness of the etching sacrifice layer be between 10 nm and 10 μm inclusive.

The above-described effect is fully obtained by using this etching sacrifice layer formed in this film thickness.

According to a second aspect of the invention, a method for manufacturing a polarizing device has a polarizing device unit composed of a metallic film on a base, the metallic film having a plurality of slit-shaped openings. This method includes: forming an etching sacrifice layer having an etching rate equal to or greater than that of the metallic film on the base; and forming the metallic film on the etching sacrifice layer, and patterning the metallic film by etching, so as to form the polarizing device unit.

In this polarizing device, the sacrifice layer provided with the etching rate equal to or greater than that of the metallic film prevents the side etching of the metallic film, since the sacrifice layer is dug in instead during the etching of the metallic film. Therefore, the overetching of the polarizing device unit is prevented, and the polarizing device is formed in a high aspect ratio with a high optical property.

It is preferable that a resin material be used as a material composing the etching sacrifice layer.

This prevents the polarizing device unit from being damaged when carrying out rubbing processing in order to form an orientation film on the polarizing device unit, at the time of mounting the polarizing device in the liquid crystal device, since the rubbing pressure is moderated by the etching sacrifice layer composed of a resin material. Consequently, the polarizing device can be built into the liquid crystal device in a favorable manner.

Moreover, it is preferable that the resin material include one of methacrylic resin and acrylic resin. This allows a suitable usage of the etching sacrifice layer described above.

According to the above method for manufacturing a method for manufacturing a polarizing device, it is preferable that the resin material be deposited by spin coating.

This facilitates an easy forming of an etching sacrifice layer with a high level of flatness.

According to a third aspect of the invention, a liquid crystal device includes the aforementioned polarizing device.

According to this third aspect of the invention, the liquid crystal device includes a polarizing device with excellent optical property, and therefore a highly reliable liquid crystal device is provided.

In this case, it is preferable that the liquid crystal device further include a liquid crystal layer between a pair of substrates, wherein the polarizing device is formed on a surface of at least one of the pair of substrates, the surface facing the liquid crystal layer.

This way, the aforementioned polarizing device with the excellent optical property is mounted inside the liquid crystal device, thereby reducing the thickness of the liquid crystal device.

According to a fourth aspect of the invention, a projection display device includes the aforementioned liquid crystal device as an optical modulation device.

This projection display device carries out the optical modulation in a favorable manner, allowing a high-precision, high-luminance display.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of a polarizing device and a manufacturing method thereof according to the aspects of the invention will now be described with references to drawings. The following figures used in the descriptions below have different scale sizes modified for each of the components, so that each of them will be sufficiently large to be recognized.

Polarizing Device

Figure 1A:
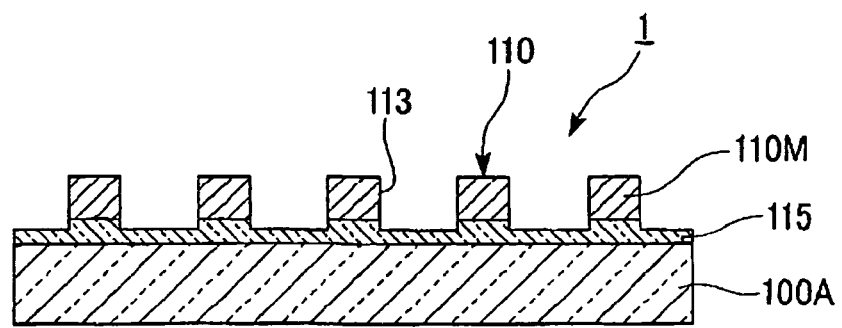
FIGS. 1A and 1B are a partial sectional view and a perspective view, both illustrating a polarizing device.
Figure 1B:
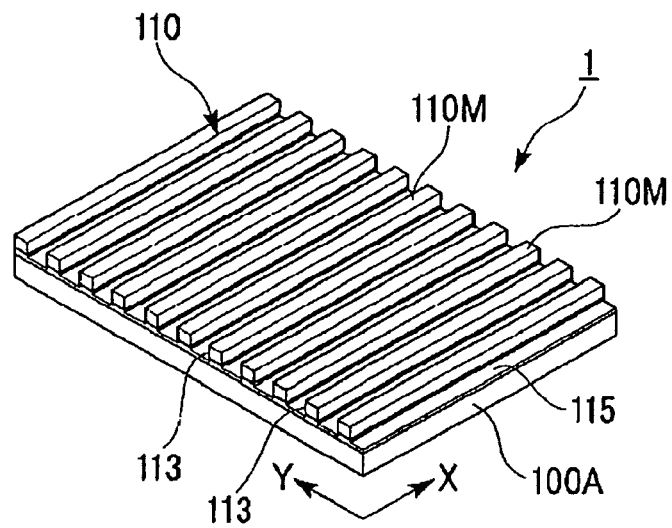
Figure 2:
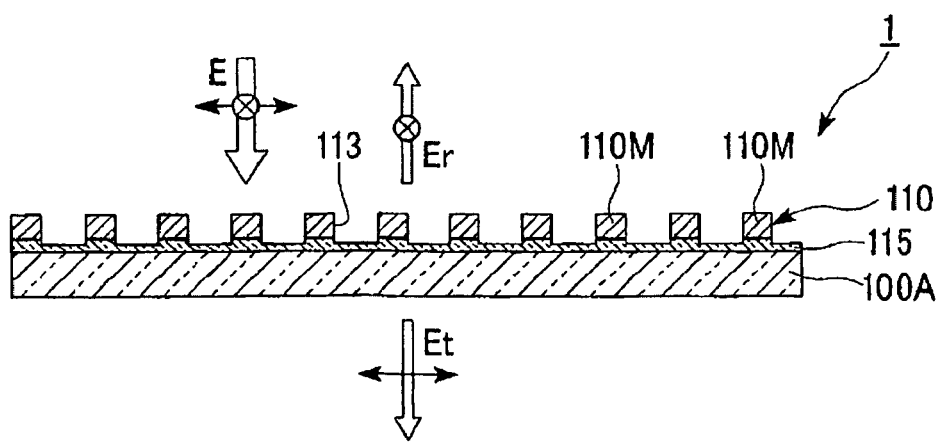
FIG. 2 is an illustration that describes the operation of the polarizing device.

FIG. 1A is a partial sectional view showing a polarizing device 1 according to this embodiment. FIG. 1B is a perspective view showing polarizing device units 110 constituting the polarizing device. FIG. 2 is an illustration that describes the operation of the polarizing device 1.

The polarizing device 1 includes an undercoat layer (an etching sacrifice layer) 115 covering a base 100A, and the polarizing device units 110 formed on this undercoat layer 115. The polarizing device units 110 that have a wire grid structure are composed mainly with a metallic film formed including a plurality of openings 113 shaped in slits on a surface of the undercoat layer 115. Metallic films 110M are formed in a pattern of stripes in plan view, with, for instance, a width of 30 nm, a height of 100 nm, and a pitch of 140 nm.

Here, the L/S ratio is an important parameter in determining the optical property of a polarizing device 1, where the width of each of the metallic films 110M is defined as L and a space between the metallic films 110M is defined as S. In this embodiment, a high optical property is obtained by setting the L/S ratio to be as small as, for instance, 3/11.

The base 100A is formed including a transparent substrate composed of materials such as glass, quartz, and plastics.

Aluminum (Al) is used as a metal material composing the metallic films 110M. Other examples of metals composing the metallic films 110M include gold, copper, palladium, platinum, rhodium, silicon, nickel, cobalt, manganese, iron, chromium, titanium, ruthenium, niobium, neodymium, ytterbium, yttrium, molybdenum, indium, bismuth, and alloys thereof.

The undercoat layer 115 is formed on the surface of the base 100A, and is partly etched together with the metallic films 110M during the etching (patterning) of the polarizing device units 110. In other words, since the undercoat layer 115 is partially dug by etching, during the patterning of the metallic films 110M, the undercoat layer 115 serves to expand the margin in controlling an etching endpoint. The undercoat layer 115 is composed of a material having an etching rate equal to or higher than that of the metallic films 110M.

Both organic and non-organic materials may be employed as a material of the undercoat layer 115, as long as the above function is satisfied. In this embodiment, the undercoat layer 115 composed of a resin material is used. Examples of this resin material include methacrylic resin (PMMA, or polymethyl methacrylate) and acrylic resin (UV-curable resin). Specifically, OEBR-1000 (a trade name, produced by Tokyo Ohka Kogyo Co., Ltd), PAK-01 (a trade name, produced by Toyo Gosei Co., Ltd), and Dow Coarning HSQ (distributed by Dow Corning Toray Co., Ltd.).

Examples of non-resin materials for forming the undercoat layer 115 includes $SiO_2$, SiN, SiON, $Al_2O_3$, $TiO_2$, and $SnO_2$.

The stripe pattern of polarizing device 1 formed in a pitch narrower than the wavelength of the visible light as shown in FIG. 2 allows selecting the polarization direction of the light entering the polarizing device 1. Specifically, the polarizing device 1 transmits linearly polarized light Et that has a polarization axis orthogonal to the direction in which the metallic films 110M extend, while reflecting linearly polarized light Er that has a polarization axis parallel to the direction in which the metallic films 110M extend. Therefore, the polarizing device 1 according to this embodiment includes a reflection axis parallel to the direction in which the metallic films 110M extend (the x-axis direction in FIG. 1B), and a transmission axis orthogonal to the reflection axis (the y-axis direction in FIG. 1B).

The polarizing device 1 according to this embodiment includes the undercoat layer 115 with the etching rate thereof being equal to or larger than that of the metallic films 110M. Therefore, the undercoat layer 115 is dug in instead of the metallic films 110M during the patterning thereof. This expands the margin in the endpoint control of the etching, thereby preventing the overetching of the polarizing device units 110. Consequently, the polarizing device 1 has a high aspect ratio structure with a high optical property, while the overetching of the polarizing device 1 is prevented.

Manufacturing Method of Polarizing Device

A method for manufacturing the aforementioned polarizing device 1 will now be described with reference to FIGS. 3A through 3D. FIGS. 3A through 3D are sectional views illustrating the polarizing device 1.

Figure 3A:
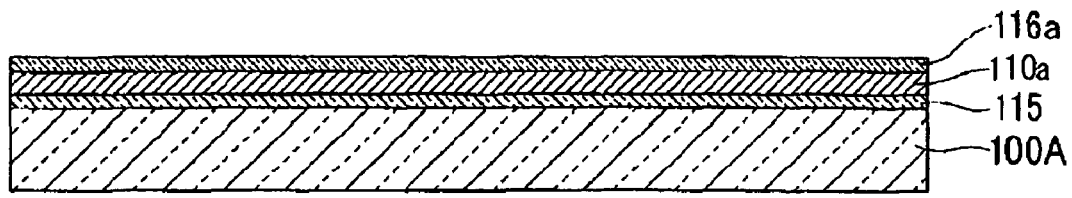
FIGS. 3A through 3D are drawings of a manufacturing process of the polarizing device.

As shown in FIG. 3A, the base 100A formed with a transparent glass substrate and the like is prepared, and the aforementioned resin material (methacrylic resin or acrylic resin)

is deposited on one side of the base 100A, so as to form the undercoat layer 115 by spin-coating. Thereafter, a metal film 110a is formed on the undercoat layer 115, by depositing an aluminum film in a solid pattern using methods such as sputtering. Thereafter, a silicon oxide film 116a is formed on the metal film 110a in a solid pattern using methods such as sputtering. This silicon oxide film 116a functions as a hard mask during the patterning of the metal film 110a.

Figure 3B:
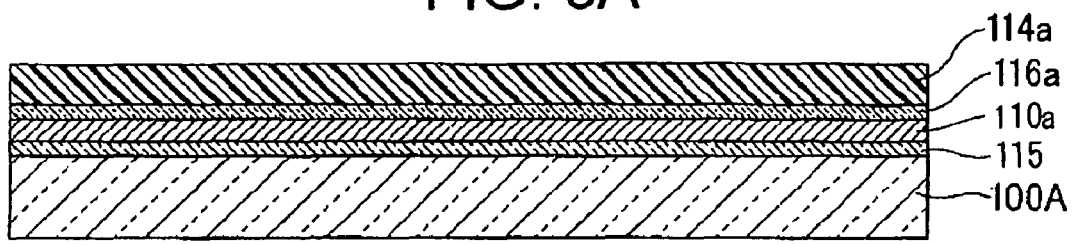
Figure 3C:
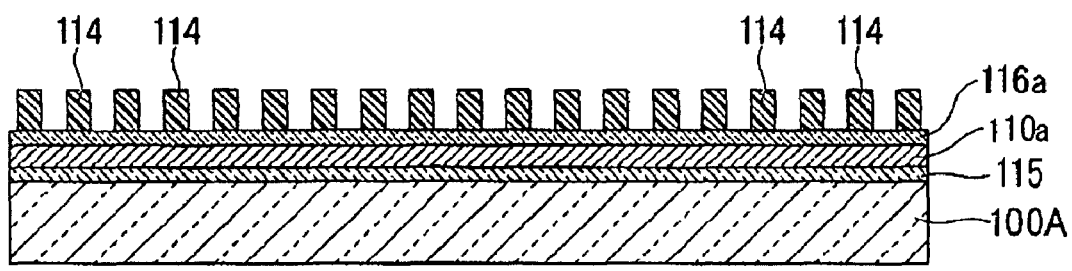

Thereafter, as shown in FIG. 3B, a resist layer 114a is formed by coating and pre-baking a resist on the silicon oxide film 116a. The resist layer 114a is exposed by a two-beam interference exposure method, using a laser beam with a wavelength of 266 nm as the exposing light. Here, the exposure is carried out so that a fine stripe pattern has a pitch no larger than the wavelength of visible light (for instance, 140 nm). Subsequent to the exposure, the resist layer 114a is baked (PEB) and thereafter developed. Consequently, as shown in FIG. 3C, an etching mask 114 having the stripe pattern is formed on the silicon oxide film 116a as shown FIG. 3C.

Figure 4:
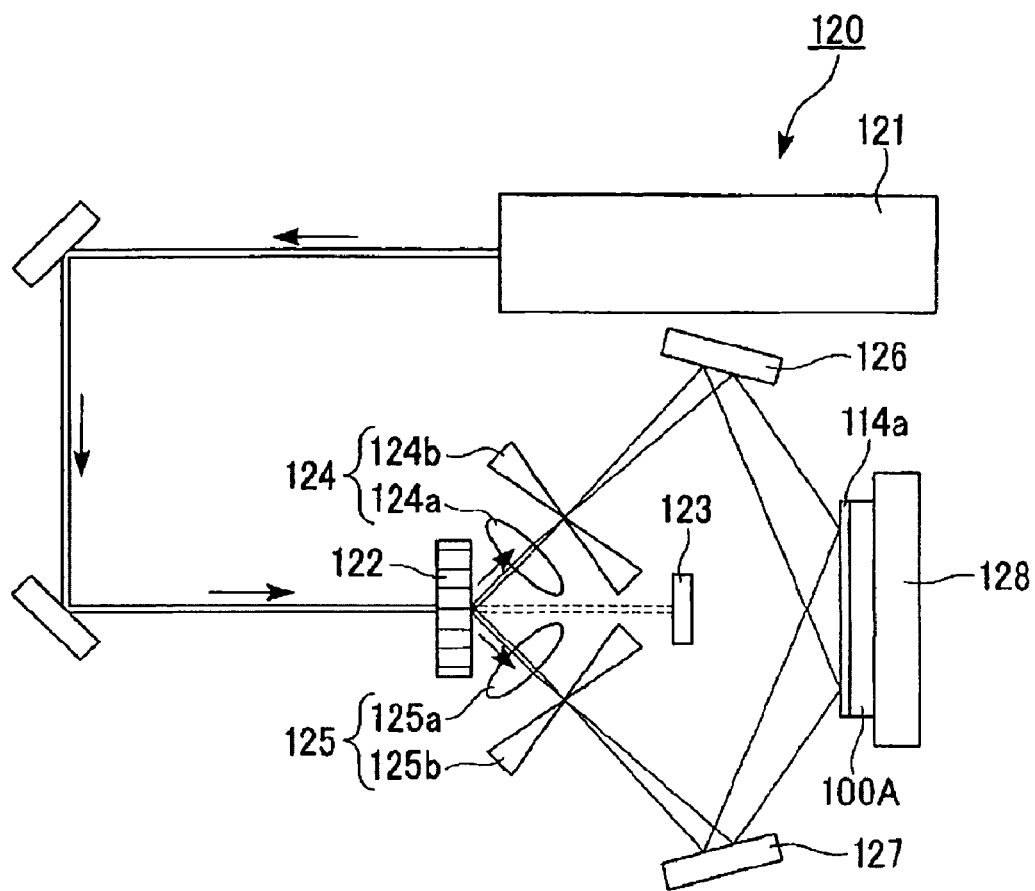
FIG. 4 is a schematic block diagram illustrating an example of an aligner used for a manufacturing of the polarizing device.
Figure 5:
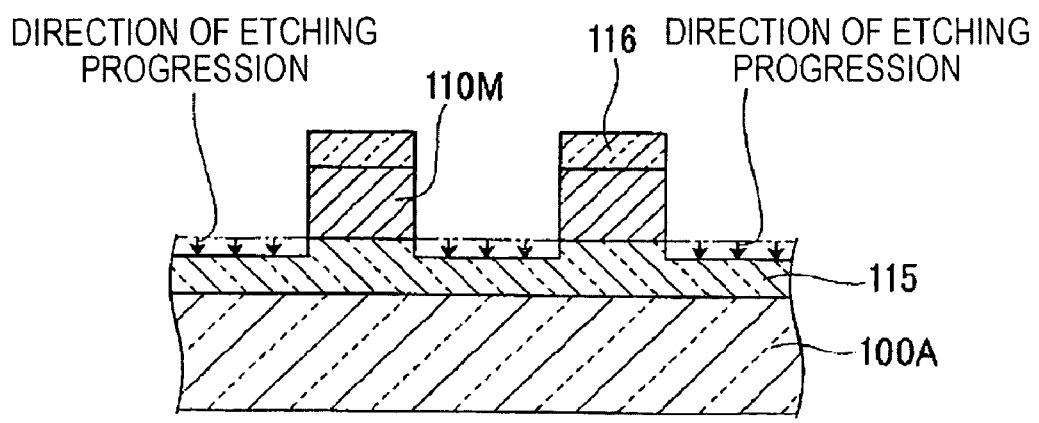
FIG. 5A is a drawing of the polarizing device manufacturing process subsequent to the processes illustrated in FIGS. 3A through 3D.

The aligner shown in FIG. 4 may be used in the two-beam interference exposure. An aligner 120 includes a laser source 121 for irradiating the exposing light, a diffraction beam splitter 122, a monitor 123, beam expanders 124 and 125, mirrors 126 and 127, and a stage 128 for placing the base 100A.

The laser source 121 is an Nd:YVO4 laser device that has a fourth harmonic wave of 266 nm. The diffraction beam splitter 122 is a splitting means for splitting a single laser beam output from the laser source 121 so as to generate two laser beams. The diffraction beam splitter 122 generates two diffraction beams (±first order) with the same intensity, if the incident laser beam is TE polarized. The monitor 123 receives and converts the light output from the diffraction beam splitter 122 into electric signals. With this aligner 120, adjustments such as a crossing angle of the two laser beams is carried out based on the converted electric signals.

The beam expander 124 includes a lens 124a and a space filter 124b, and expands the beam diameter of one of the two laser beams split by the diffraction beam splitter 122 to, for instance, approximately 300 mm. Similarly, the beam expander 125 includes a lens 125a and a space filter 125b, and expands the beam diameter of one of the two laser beams split by the diffraction beam splitter 122. The mirrors 126 and 127 reflect the laser beams transmitting through the beam expanders 124 and 125 toward the stage 128. The mirrors 126 and 127 generate a coherent light by intercrossing the reflected laser beams and irradiating this coherent light onto the resist layer 114a on the base 110A.

A resist 114 is formed in a pitch narrower than the wavelength of the laser source 121, by irradiating the coherent light to the resist layer 114a using the aligner 120 described above. This resist 114 is formed at a position satisfying the aforementioned L/S ratio (3/11).

Figure 3D:
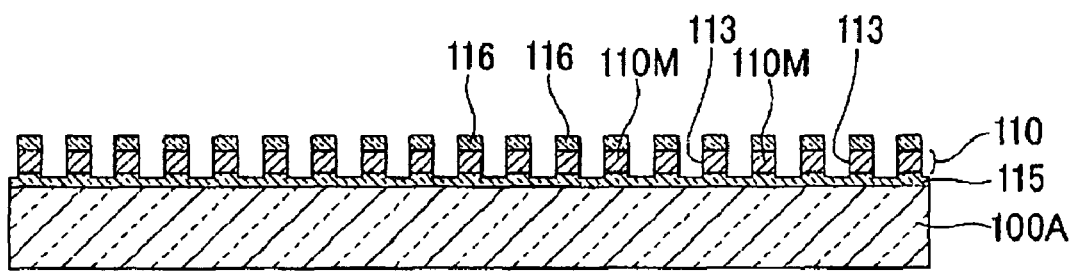

Thereafter, dry etching processing is carried out through the resist 114, and the silicon oxide film 116a is patterned, in order to form a mask 116 as shown in FIG. 3D. Here, the resist 114 may either be delaminated after forming the mask 116, or be removed by etching during the patterning of the metal film 110a.

The metal film 110a is then patterned with the dry etching processing through the mask 116. Specifically, the etching is carried out through the mask 116 with an ion etching device using an etching gas composed of boron trichloride ($BCl_3$), chlorine ($Cl_2$), and carbon tetrachloride ($CCl_4$).

As described, the mask 116 has the L/S ratio as small as 3/11, the pattern thereof corresponding to the polarizing device units 110 that has a high aspect structure. When forming such a structure in a high aspect, endpoint control in etching becomes particularly difficult.

According to this embodiment, the patterning of the metal film 110a exposes the undercoat layer 115 provided beneath the metal film 110a. Since this undercoat layer 115 is composed of materials (methacrylic resin or acrylic resin) that have the etching rate equal to that of the metal film 110a or higher, the dry etching proceeds so as to dig into the part of the undercoat layer 115 without side etching the metal film 110a. Therefore, the overetching, i.e. the dry etching proceeding inward from the fringe of the mask 116 in the width direction in top view, is prevented. Consequently, as shown in FIG. 3D, the polarizing device units 110 are formed on the base 110A, and the polarizing device units 110 are composed of the metallic films 110M including the openings 113 shaped in slits. Moreover, the mask 116 is formed on the top surface of the metallic film 110M, along the direction the metallic films 110M extend.

Figure 6A:
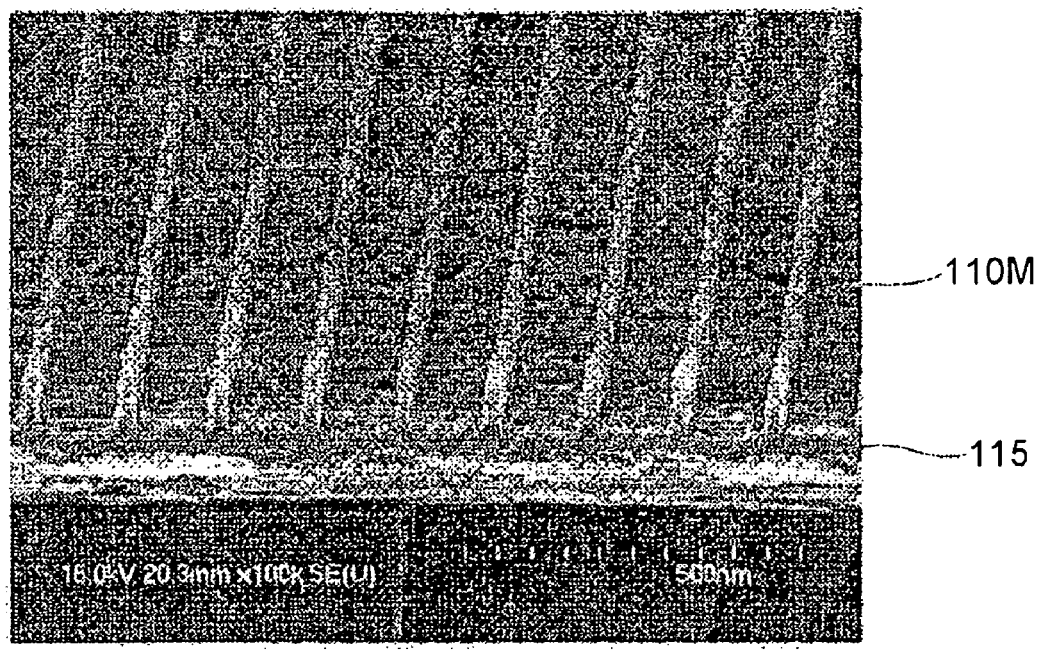
FIG. 6A is a photograph of a sectional structure of the polarizing device according to the invention and FIG. 6B is a photograph of a polarizing device with a common structure.

The polarizing device 1 is manufactured by the processes described above. FIG. 6A is an electron microgram of the polarizing device 1 according to the aspects of the invention manufactured using the method of this embodiment. As shown in FIG. 6A, the polarizing device 1 obtained in this embodiment includes a plurality of openings shaped in slits formed between the metallic films 110M deposited on the undercoat layer 115. The manufacturing method of the polarizing device 1 according to this embodiment ensures the manufacturing of the metallic films 110M constituting the wire grid in a high aspect ratio.

Figure 6B:
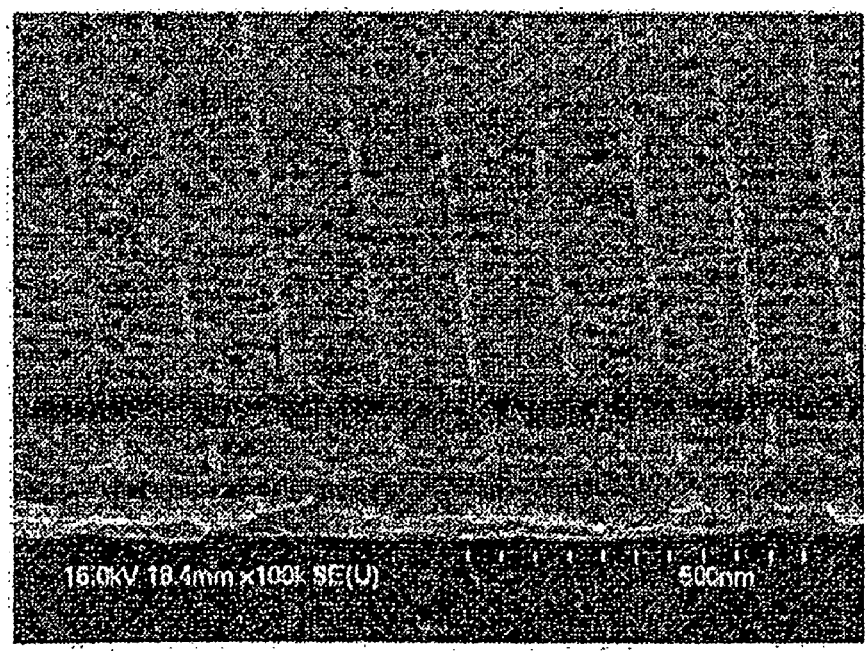

FIG. 6B is an electron microgram of the polarizing device units 110 formed on the base 100A by dry etching, using a common manufacturing method in which the undercoat layer 115 is not formed. As disclosed in the micrograms, etching the metallic films 110M without forming the undercoat layer 115 makes it difficult to control the endpoint of the metallic films 110M in a preferable manner during the dry etching. As a result, the metallic films 110M are overetched and a desirable grid structure cannot be obtained, resulting in the decline of the optical property of the polarizing device.

Projector

Figure 7:
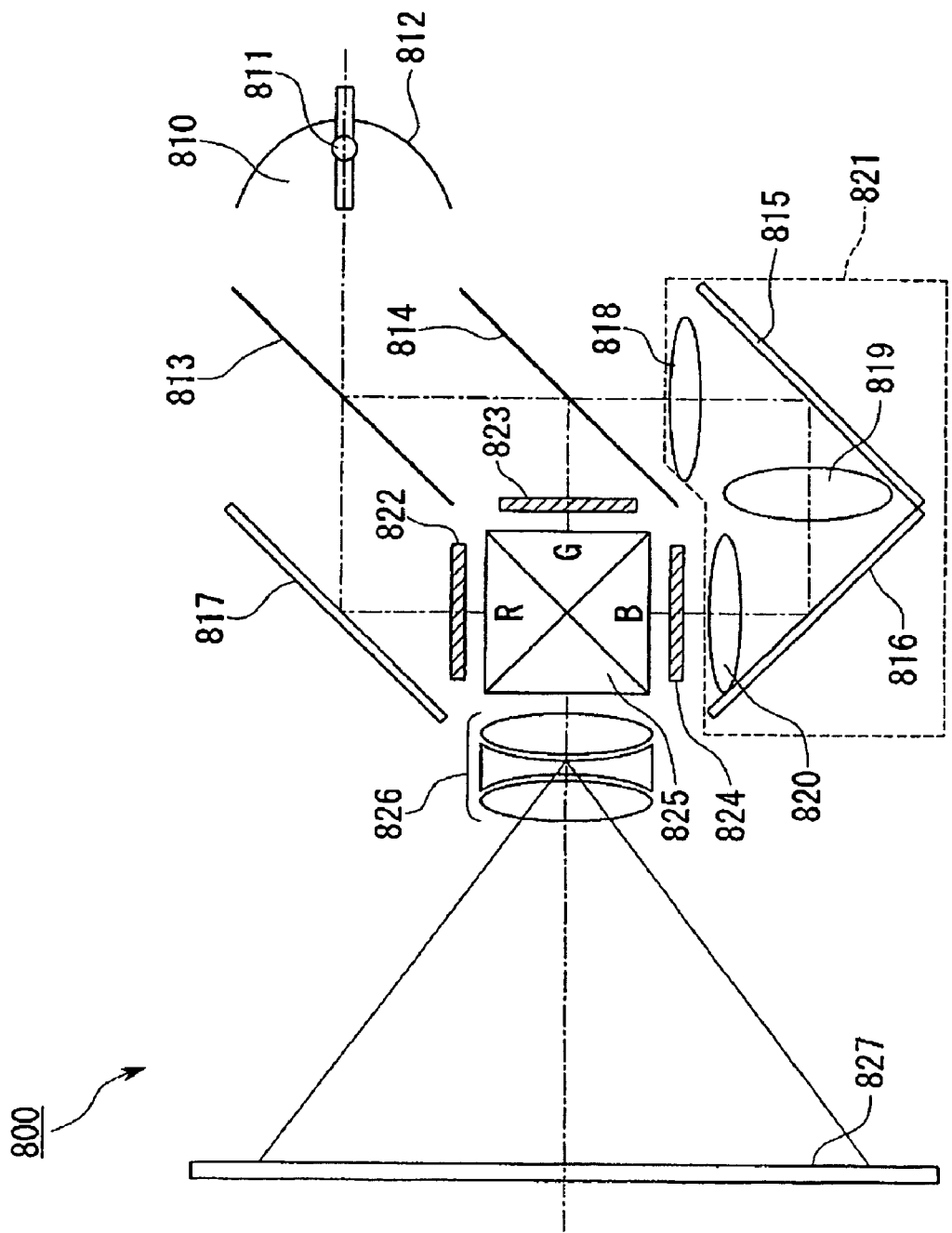
FIG. 7 is a schematic block diagram illustrating a projector.

FIG. 7 is a schematic block diagram illustrating the main parts of a projector as one embodiment (a second embodiment) of the projection display device according to the aspects of the invention. A projector 800 according to the second embodiment is a liquid crystal projector using the liquid crystal device as an optical modulation device.

Referring now to FIG. 7, the projector 800 includes a light source 810, dichroic mirrors 813 and 814, reflection mirrors 815, 816, and 817, an entrance lens 818, a relay lens 819, an exit lens 820, optical modulation devices 822, 823, and 824 formed including liquid crystal devices, a cross dichroic prism 825, and a projection lens 826.

The light source 810 is formed including a lamp 811 such as a metal halide lamp, and a reflector 812 that reflects the lamplight. Other examples of lamps used in the light source 810 include an extra high-pressure mercury lamp, a high-pressure mercury lamp, a mercury flash lamp, a deep UV lamp, a xenon lamp, and a xenon flash lamp.

The dichroic mirror 813 transmits a red light ray contained in white light coming from the light source 810, and reflects blue and green light rays. The red light ray that transmitted through the dichroic mirror 813 is then reflected by a reflection mirror 817 and enters the liquid crystal optical modulation device 822 of the red light ray. The green light ray reflected by the reflection mirror 813 is then reflected by the dichroic mirror 814, and enters the liquid crystal optical modulation device 823 of the green light ray. Moreover, the blue light ray reflected by the dichroic mirror 813 transmits through the dichroic mirror 814. In order to prevent optical loss of light passing through a long optical path, a light guide unit 821 is installed, the light guide unit 821 including a relay lens system that has the relay lens 819 and the exit lens 820. The blue light ray enters the liquid crystal optical modulation device 824 of the blue light ray, through this light guide unit 821.

The three light rays modulated by the optical modulation devices 822 to 824 enter the cross dichroic prism 825. This cross dichroic prism 825 includes four rectangular prisms adhered to one another, and its interface has a dielectric multilayer film that reflects the red light and another dielectric multilayer film that reflects the blue light, together forming an X shape. These dielectric multilayer films synthesize the light beams of three colors, so as to form the light ray representing color images. The synthesized light ray is projected onto a screen 827 by the projection lens 826, i.e. an optical system for projection, so as to magnify and display the images.

Figure 8:
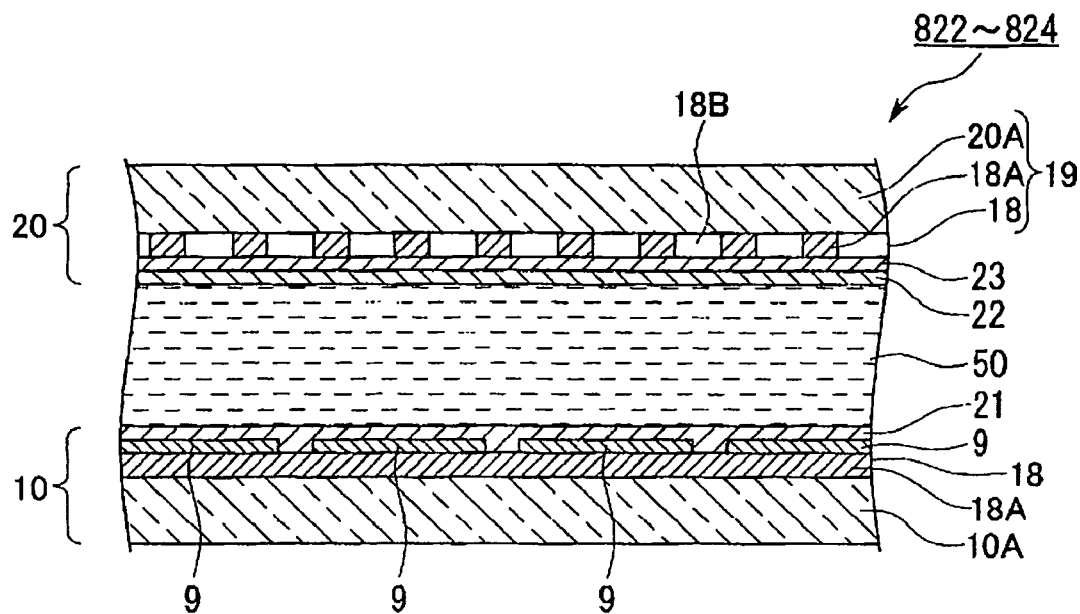
FIG. 8 is a schematic view of a liquid crystal device used as an optical modulation device.

A projector 800 according to the second embodiment employs a liquid crystal device illustrated in FIG. 8 as the optical modulation devices 822 to 824 (hereafter also referred to as optical modulation devices 822 to 824).

Liquid Crystal Device

FIG. 8 is a schematic view of the liquid crystal devices 822 to 824, and these liquid crystal devices 822 to 824 each have a structure of having a liquid crystal layer 50 between substrates 10 and 20.

The substrate 10 is a device substrate, and includes a wire grid polarizing layer 18, pixel electrodes 9, and an orientation film 21 on a substrate body 10A. The substrate 10 further includes un-illustrated thin film transistor (TFT) devices for driving the switching of voltage impression on pixel electrodes 9. On the other hand, the substrate 20 is a counter substrate, and includes another wire grid polarizing layer 18, a counter electrode 23, and an orientation film 22 on a substrate body 20A.

According to this embodiment, one of the wire-grid polarizing layers 18 and the substrate body (i.e. base) 10A (or 20A) constitute a polarizing device 19 (wire-grid type). The substrate bodies 10A and 20A also serve as substrates for both the polarizing device and the liquid crystal device. The polarizing devices 19 are manufactured using the method for manufacturing the polarizing device described above. Un-illustrated undercoat layers 151 made of a resin material are formed between the substrate body 10A and one of the wire-grid polarizing layers 18, as well as between the substrate body 20A and another one of the wire-grid polarizing layers 18.

Examples of materials used for the orientation films 21 and 22 formed on the polarizing devices 19 (wire-grid type) include organic materials such as polyimide which underwent rubbing processing. During the rubbing processing, a rubbing pressure is impressed on the wire-grid polarizing layers 18. At this time, the undercoat layers 151 composed of a resin material moderates the rubbing pressure, the undercoat layers 151 being present between the substrate body 10A and one of the wire-grid polarizing layers 18, as well as between the substrate body 20A and another one of the wire-grid polarizing layers 18, thereby preventing the damage of the wire-grid polarizing layer 18.

In the structure illustrated in FIG. 8, the substrates 10 and 20 are adhered together with an un-illustrated sealer, and liquid crystal is sealed into the space between the substrates 10 and 20. In this case, twisted nematic (TN) mode is employed as the liquid crystal mode of the liquid crystal layer 50. Examples of other modes that can be employed include a super twisted nematic (STN) mode and an electrically controlled birefringence (ECB) mode.

The wire-grid polarizing layers 18 are positioned so that metal projections 18A included in one of the wire-grid polarizing layers 18 provided closer to the substrate 10 are aligned to cross the metal projections 18A included in the other one of the wire-grid polarizing layers 18 provided closer to the substrate 20.

Such wire-grid polarizing layers 18 selectively transmits the polarized light beams of each color emitting from the light source 810, transmitting only the linearly polarized light through the liquid crystal layer 50.

As shown in FIG. 8, the wire-grid polarizing layers 18 are formed including the multiple metal projections 18A arrayed in stripes with a pitch smaller than the wavelength of light entering the liquid crystal layer 50. This structure allows the wire-grid polarizing layers 18 to function as a reflective polarizing device that reflects the polarized light oscillating in a direction approximately parallel to the direction in which the metal projections 18A extend, while transmitting the polarized light oscillating in a direction approximately vertical to the direction in which the metal projections 18A extend.

Figure 9:
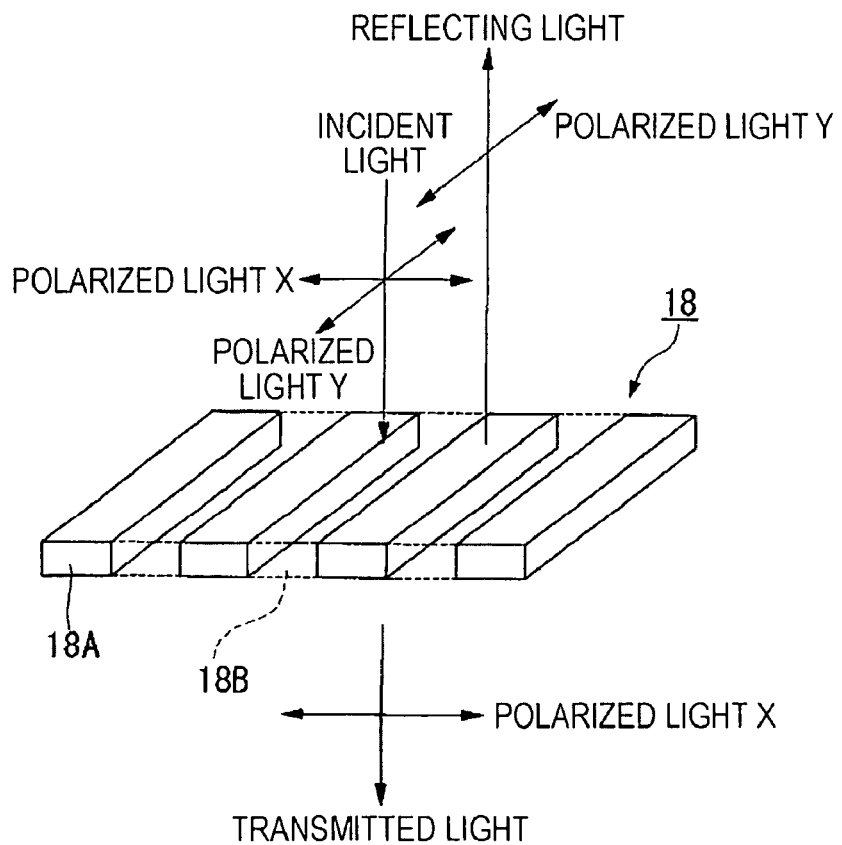
FIG. 9 is an explanatory drawing showing the effect of a polarizing layer.

That is to say, the direction of polarization is selected in accordance with the direction of polarized light entering the wire-grid polarizing layers 18. Therefore, as shown in FIG. 9, each of the polarizing devices 19 transmits a linearly polarized light X that has a polarization axis orthogonal to the direction in which each of the wire-grid polarizing layers 18 extends, while reflecting a linearly polarized light Y that has a polarization axis parallel to the direction in which each of the wire-grid polarizing layers 18 extends.

The wire-grid polarizing layers 18 have an effect same as that of light-reflective polarizing devices, which is to transmit the polarized light parallel to the light axis (transmitting axis) and to reflect the polarized light vertical to the light axis.

As described, in the liquid crystal devices 822 to 824, the linearly polarized light enters the liquid crystal layer 50 through the wire-grid polarizing layer 18 embedded inside the substrate 10 (or 20) shown in FIG. 8, and a phase control is carried out in this liquid crystal layer 50. In other words, the control in driving the liquid crystal layer 50 is driven by impressing voltages to pixel electrodes 9 and 23, so as to control the phase of the incident light. The phase-controlled light is selectively transmitted through another wire-grid polarizing layer 18 embedded inside the opposite substrate 20 (or 10). Since the wire-grid polarizing layers 18 according to the second embodiment have structures in a high aspect ratio as described above, an excellent optical property is obtained.

In this embodiment, the polarizing devices are embedded in liquid crystal panels. Therefore, the substrate bodies 10A and 20A function as a substrate for the liquid crystal device as well as a substrate for the polarizing device. This reduces the number of parts used in the device, thereby making the whole device thinner and improving the function of the liquid crystal device. The cost reduction is also achieved since the device structure is simplified.

As shown in FIG. 4, colored rays modulated by the liquid crystal devices 822 to 824 enter the cross dichroic prism 825 and are synthesized as described above. The synthesized light ray is projected onto a screen 827 by the projection lens 826, i.e. an optical system for projection, so as to magnify and display the images.

The above-described projector 800 includes, as the optical modulation means, the liquid crystal devices in which the polarizing devices are embedded.

The liquid crystal devices 822 to 824 have properties of high display brightness and low power consumption, without display defects nor any decline in reliability, since the wire-grid polarizing layers 18 with the high aspect structures are included therein as described above. The projector 800 according to this embodiment of the invention is therefore highly reliable and has an excellent display property, since the liquid crystal devices 822 to 824 are included therein as the optical modulation means.

The scope of technology according to the present invention shall not be limited to the above-mentioned aspects and embodiment, and includes the scope in which appropriate modifications are added without departing from the main scope of the invention. For instance, while the liquid crystal devices in the embodiments are provided with TFT as an example of switching elements, the aspects of the invention can be applied to liquid crystal devices with two-terminal elements such as thin film diode as the switching elements. Moreover, the second embodiment is described using a three-panel projector (projection display device) as an example, while the aspects of the invention may be applied also to a single-panel projection display device and a direct-view display device.

The liquid crystal devices according to the embodiments of the invention may also be applied to electronic apparatuses other than projectors, such as mobile phones. Display units of such mobile phones are provided with liquid crystal devices according to the embodiments described above, or according to the modifications thereof. Examples of other electronic apparatuses include an integrated circuit (IC) card, a mobile phone, a video camera, a personal computer, a head-mounted display, a fax machine with a display function, a viewfinder of a digital camera, a mobile television, a digital signal processor (DSP) device, a personal digital assistants (PDA), an electronic notebook, a video billboard, and a display for commercial messages.

What is claimed is:

1. A polarizing device, comprising:
   a polarizing device unit composed of a metallic film formed on a base, the metallic film having a plurality of slit-shaped openings; and
   an etching sacrifice layer provided between the base and the polarizing device unit, so that the etching sacrifice layer is partly etched together with the metallic film during the etching of the polarizing device unit, wherein the etching sacrifice layer is composed of a material that has an etching rate equal to or greater than that of the metallic film.

2. The polarizing device according to claim 1, wherein the etching sacrifice layer is made of a resin material.

3. The polarizing device according to claim 2, wherein the resin material includes one of methacrylic resin and acrylic resin.

4. The polarizing device according to claim 1, wherein a film thickness of the etching sacrifice layer is between 10 nm and 10 μm inclusive.

5. A liquid crystal device comprising the polarizing device according to claim 1.

6. The liquid crystal device according to claim 5, further comprising:
   a liquid crystal layer between a pair of substrates, wherein the polarizing device is formed on a surface of at least one of the pair of substrates, the surface facing the liquid crystal layer.

7. A projection display device comprising the liquid crystal device according to claim 5 as an optical modulation device.

8. A method for manufacturing a polarizing device having a polarizing device unit composed of a metallic film on a base, the metallic film having a plurality of slit-shaped openings, the method comprising:
   forming an etching sacrifice layer having an etching rate equal to or greater than that of the metallic film on the base; and
   forming the metallic film on the etching sacrifice layer, and patterning the metallic film by etching, so as to form the polarizing device unit.

9. The method for manufacturing a polarizing device according to claim 8, wherein a resin material is used as a material composing the etching sacrifice layer.

10. The method for manufacturing a polarizing device according to claim 9, wherein the resin material includes one of methacrylic resin and acrylic resin.

11. The method for manufacturing a polarizing device according to claim 9, wherein the resin material is deposited by spin coating.

* * * * *